United States Patent [19]

Aeberli

[11] 4,243,635
[45] Jan. 6, 1981

[54] WASTE INCINERATOR EXHAUST GAS TREATMENT AND APPARATUS

[75] Inventor: Hans Aeberli, Meggen, Switzerland

[73] Assignee: Von Roll AG, Gerlafingen, Switzerland

[21] Appl. No.: 874,803

[22] Filed: Feb. 3, 1978

[30] Foreign Application Priority Data

Feb. 24, 1977 [CH] Switzerland .................. 2331/77

[51] Int. Cl.³ .................. B01J 8/00; B03C 3/01; C01B 7/00; F01N 3/08
[52] U.S. Cl. .................. 422/176; 55/5; 55/71; 55/118; 55/132; 55/154; 55/262; 422/177; 422/168; 423/240
[58] Field of Search .............. 422/168, 171, 172, 176, 422/177; 55/118, 122, 132, 154, 5, 71, 262; 423/240

[56] References Cited

U.S. PATENT DOCUMENTS

| 2,555,216 | 5/1951 | Wintermute | 55/118 |
| 3,055,158 | 9/1962 | Smith | 55/118 |
| 3,800,505 | 4/1974 | Tarves, Jr. | 55/122 |
| 3,907,520 | 9/1975 | Huang et al. | 422/168 |
| 3,958,961 | 5/1976 | Bakke | 55/118 |
| 3,997,294 | 12/1976 | Kritzler | 55/220 X |
| 4,036,593 | 7/1977 | Satoh | 55/223 |
| 4,043,768 | 8/1977 | Bennett | 55/5 |
| 4,070,162 | 1/1978 | Kober | 55/35 |
| 4,116,789 | 9/1978 | King | 55/132 X |

FOREIGN PATENT DOCUMENTS 2412995 10/1975 Fed. Rep. of Germany ............ 55/132

Primary Examiner—Michael S. Marcus
Attorney, Agent, or Firm—Weingarten, Maxham & Schurgin

[57] ABSTRACT

The disclosed treatment is for the removal of hydrogen halide constituents of an exhaust gas by means of a dry scrubbing agent to which the gas binds. The agent is sprayed into the gas in finely divided form just prior to flow of the gas through a register located at the entrance to a filter chamber. The agent is thus distributed evenly over the input of the filter and performs its binding function primarily while on the filter. The agent may be sprayed as a finely divided solid or as a fluid which rapidly dries to leave a coating of finely divided agent on the filter.

Also disclosed is an apparatus for practicing the method, including a nozzle casing with a plurality of spray nozzles located in the gas passageway at the input side of a register at the entrance to the filter chamber housing an electrical filter. The filter elements of the filter are so designed that the gas passageways between them force the gas to make periodic, sudden changes in direction which lead to a pulsation and a resulting gas turbulence. The turbulence improves the action of the agent on the gases.

4 Claims, 4 Drawing Figures

WASTE INCINERATOR EXHAUST GAS TREATMENT AND APPARATUS

BACKGROUND OF THE INVENTION

The present invention relates to means for reducing the amount of damaging hydrogen halide gases present in the stack exhausts of incinerators for trash and industrial waste.

In order to satisfy the requirements of environmental protection laws relating to the damaging hydrogen halide content of exhaust gases generated by the burning of solid, liquid, and gas waste from home and industry, it is known to provide in the path of the exhaust gas, in addition to the mechanical or electrical filter for separating out the fly ash, a special exhaust wet scrubbing apparatus for reducing the content of the damaging gas. While a large portion of the hydrogen halide, which is readily soluble in water, present in the exhaust gases is removed by such wet scrubbing, nevertheless this leads to an undesirably high concentration of halides in the effluent from the system. Removal from the effluent would require neutralization and a rather costly heating of the fluid to form removable agglomerates of the precipitate which would be formed by neutralization. The wet scrubbing cannot simultaneously remove the particulates and the damaging gases, and it is always used together with a filter, such as an electrostatic precipitator. This filter brings with it the further complicating problem of environmentally acceptable disposal. Additionally, since even on being warmed, the exhaust gases leave the stack saturated with water vapor, this leads to what some refer to as stack gas "rain" on cold weather days.

In order to deal with the above-mentioned problems, it is known to use a dry scrubbing process. In this process a dry scrubbing agent, such as a magnesium-based caustic lime, is blown into the exhaust gas stream of a waste incinerator combustion chamber to bind to damaging gases, such as primarily hydrogen chloride (HCl), but also hydrogen fluoride (HF), sulfur dioxide ($SO_2$), and sulfur trioxide ($SO_3$). The blowing of the powdered agent into the combustion chamber is accomplished through a plurality of injection lances extending from a secondary air supply into the combustion chamber in the lower portion of the back wall.

The known approach of injecting the dry scrubbing agent into the combustion chamber of the incinerator, however, has the disadvantage that for thermodynamic reasons the hydrogen halide gases don't bind well to the scrubbing agent at the high temperatures present in the chamber. That is, the interaction of the agent with the damaging gas components of the exhaust gases takes place relatively slowly and with little intensity.

In other presently known arrangements of the described type in which hydrogen chloride is likewise removed by means of a dry scrubbing agent, the powdered agent is introduced into a specially provided reactor vessel installed between the combustion chamber and an electrostatic precipitator, and only there caused to interact with the exhaust gases.

With such an arrangement, the interaction of the agent with the exhaust gases is no longer significantly influenced by the combustion temperature. However, there is still present the disadvantage that the relatively large special reactor vessel required is costly, requires considerable space, and adds to the maintenance of the entire incinerator installation.

SUMMARY OF THE INVENTION

In accordance with the present invention, a novel waste incinerator is so designed that a scrubbing agent in powdered or aerosol form is introduced into the exhaust gases as they enter the filter and is distributed over the entire input side of the filter. The filter acts as the active bed for scrubbing of the damaging gas content from the exhaust gases. The gases have a time for interaction with the scrubbing agent which corresponds to the time spent by the gas in the filter. The particulate matter so generated is removed together with the other particulate matter which is separated out by the filter.

The present invention also includes a novel method for treating the exhaust gases of an incinerator, by which method a scrubbing agent is introduced into the exhaust gases as they enter a filter chamber and are evenly distributed over the entire input side of the filter.

DESCRIPTION OF THE PREFERRED EMBODIMENTS

Figure 1:
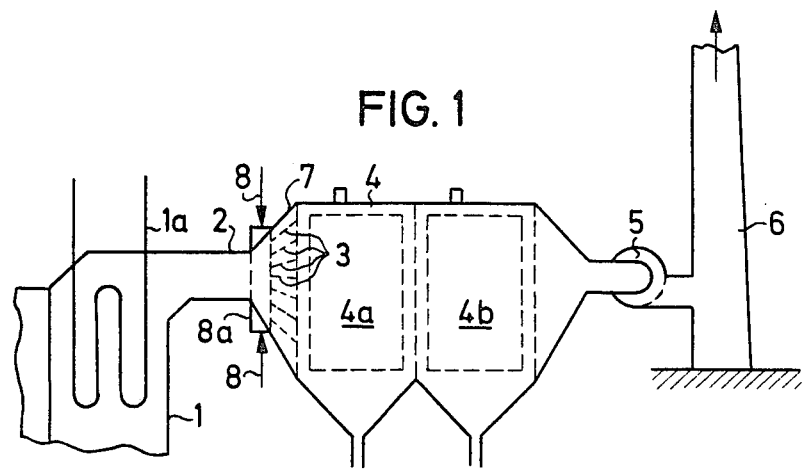
FIG. 1 is a side schematic view of the exhaust system of a trash incinerator in accordance with a preferred embodiment of the present invention.

A preferred embodiment of the present invention is exhaust gas system of the trash incinerator 1 shown in the FIG. 1. The system includes a boiler preheating element 1a of a chamber built into the incinerator, an exhaust gas passageway 2, a distributing register 3 at the end of the passageway 2, an electrostatic precipitator filter 4 disposed in two chambers 4a, 4b in series, and a typical suction ventilator 5 with exhaust stack 6.

The exhaust gases are precooled by the boiler preheating element to a temperature of from about 250 to about 300 degrees Celsius and then led through the passageway 2 and register 3 into the chambers 4a, 4b of an electrostatic precipitator filter 4. In the region denoted by the reference numeral 7 in FIG. 1, where the gas enters the filter 4, a finely divided or aerosol scrubbing agent, one which is basic and binds hydrogen halides, particularly hydrogen chloride (HCl), is sprayed through nozzles at the location indicated generally by the reference numeral 8 in FIG. 1 into the chamber 4a of filter 4 in the form of a spray curtain, so that it becomes evenly distributed over the entire cross section of the filter entrance 7. The agent may be a powder, such as magnesium-based caustic lime, a liquid, or a water solution of a substance which can be sprayed and which binds tightly to the damaging gases. The agent may also be one which becomes firm and dry as a result of being warmed by the exhaust gases during or after the interaction with the gases.

In this way the filter 4 is used as an active bed for the dry scrubbing of the exhaust gases, this being in addition to its function of separating particulates from the exhaust gases. There, within a reaction time period depending upon the gas volume capacity of the filter 4, the resulting solid products of the action of the agent on the damaging gas are separated out on the filter plates of the filter 4 simultaneously with the fly ash in the exhaust gases.

The nozzles 8 arranged immediately in front of the register 3 of the filter 4 in a star-like configuration are preferably mounted in an annular nozzle casing 8a located in the filter entrance 7.

In place of the electrostatic precipitator filter, there could also be used another dust filter, such as a tube filter, to which the described dry particulates are drawn.

Figure 2:
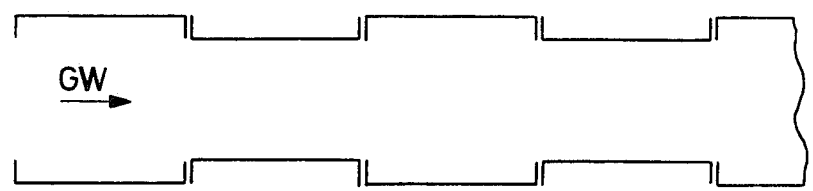
FIG. 2 is a diagrammatical view of the configuration of the interior gas passageway of an electrostatic precipitator of the exhaust system of FIG. 1.
Figure 3:
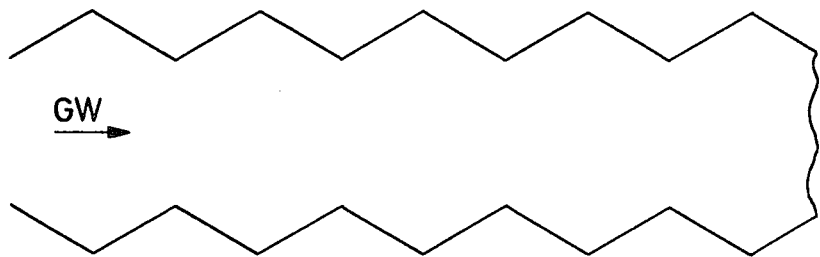
FIG. 3 is a diagrammatical view of the configuration of the interior gas passageway of an alternate design for an electrostatic precipitator for the exhaust system of FIG. 1.
Figure 4:
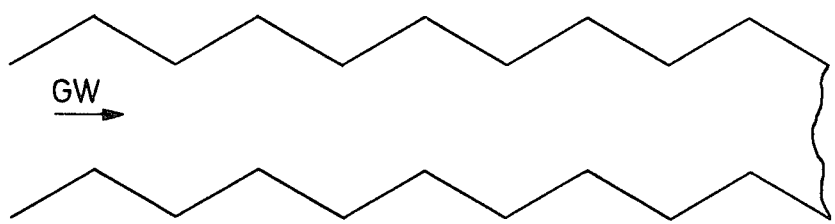
FIG. 4 is a diagrammatical view of the configuration of the interior gas passageway of an alternate design for an electrostatic precipitator for the exhaust system of FIG. 1.

The FIGS. 2-4 illustrate in schematic form some alternative designs for the filter 4 of FIG. 1 with different cross section configurations of the gas passages GW in the filter 4 to improve the efficiency of the dry scrubbing through a more intense turbulence of the exhaust gases as they pass through different portions of the filter 4.

In the design of FIG. 2, the filter separator plates on opposite sides of the gas passageway have alternately raised and recessed surface portions so aligned that along the passageway between them there are formed passage portions with equal relatively small gas passage cross sections and portions with equal relatively large gas passage cross sections as viewed in the direction of the gas flow GW. With such alternating sudden changes in the orientations of the passageway walls, there is generated at a medium gas flow velocity of, for example, one meter per second, a gas pulsation by which the gas in the transition from a larger passageway portion to a smaller one suddenly increases its velocity and in the transition from a smaller passageway portion to a larger one suddenly decreases its velocity. These sudden changes in velocity result in gas turbulences which are rhythmically repeated in the passage from portion to portion and further aid the dry scrubbing process.

In the design of FIG. 3, the separator plates making up the filter walls are so arranged that they have a zig-zag configuration and are so aligned with respect to each other on opposite sides of the gas passageway that there are formed a series of passageway portions which adjoin each other at a point of smallest passageway cross section in the direction of flow and which from that point on each increase linearly in cross section in the direction of flow to a maximum in the midpoint and then decrease linearly in cross section in the direction of flow to a minimum at the point where the next portion begins. Here also the periodic change in cross section of the gas stream in the passageway as it passes from portion to portion results in a turbulence which further aids the dry scrubbing process.

In the designing of the filter 4 to generate the desired pulsation of the gas in order to improve the dry scrubbing process by forcing the gas to undergo directional changes, it is necessary, of course, to compromise to some extent the free flow through the filter, while retaining the basic medium gas velocity of about one meter per second in the filter.

The advantage of the present invention over the process of the prior art as described in the Background of the Invention section above, and in which a scrubbing agent is sprayed into the combustion chamber, is that the lower gas temperatures present in the filter result in a much more rapid binding of the gases to the agent. The pulsation in the gas flow which is generated as a result of the design of the filter further contributes to the rapid action of the scrubbing agent. The advantage of the present invention over the process of the prior art as described in the Background of the Invention above, and in which a scrubbing agent is sprayed into a separate reactor vessel, is that the separate vessel is made unnecessary with the present invention. This is a saving of space, of initial equipment cost, and of maintenance.

A further advantage of the process in accordance with the present invention is that the scrubbing agent particles are separated out by the filter in a like manner as are the fly ash particles present in the exhaust gases.

In addition to the action of the scrubbing agent on the hydrogen halides, there is in the filter 4 the inherent scrubbing action of the fly ash particles which settle on the separator plates as a "precoat" layer and with which the particles of scrubbing agent become mixed. Those of the fly ash particles which are basic and capable of combining with the hydrogen halide gases in the exhaust gases have an opportunity to do so as the gases pass by them on the filter plates. As a result, less of the scrubbing agent is required than if the action of the fly ash were not present. Also, the fly ash is capable of relatively rapid action on the gases over a short time and can thus act as a buffer for sudden increases in the demand for scrubbing. The presence of the scrubbing agent in the layer of particulates on the separator plates of the filter 4 also reduces the damaging effects of corrosion of the plates by the gases.

Since it is known that an atmosphere containing water vapor improves the functioning of a electrostatic precipitator filter, it could be of particular significance to spray the scrubbing agent in a fluid or dissolved form which, for example, forms solid substances with the damaging exhaust gas constituents, or which as a result of evaporation of the water constituent by absorption of heat from the exhaust gases changes to a dry substance.

The additional particulate load on the filter which is occasioned by the introduction of the dry scrubbing agent into the filter in accordance with the present invention requires only about a 2 to 3% increase in the capacity of the filter, and thus is only a small additional load when compared to the amount of fly ash which is normally required to be removed by the filter. Since the use of a secondary source of air or another gas for introducing the agent through the nozzles into the exhaust gas will increase somewhat the total volume of gas to be handled by the filter 4, it may be desired in order to minimize the volume load on the filter to use exhaust gas which is branched off and blown back into the system as the vehicle for the agent, thus maintaining the total gas volume constant. Of course, other gas or liquid vehicles can also be used for the introduction of the agent. Water would be a particularly inexpensive vehicle.

I claim:

1. A waste incinerator comprising:

means defining a combustion chamber;

means defining an exhaust gas passageway in communication with said combustion chamber and having a flow therethrough away from said combustion chamber of exhaust gases generated by combustion in said combustion chamber;

filter means disposed in said exhaust gas passageway for separating particulate material from said exhaust gas flow, said filter means having an input side and an output side, said output side having a gas pressure lower than the gas pressure of said input side;

filter elements disposed within said filter means and having filter surfaces formed thereon, said filter surfaces being adapted to receive deposits of said particulate material thereon, at least some of said filter surfaces being nonplanar and being so oriented that exhaust gases passing over said some of said filter surfaces are subject to sudden directional changes in a regular manner resulting in turbulence intensifying pulsations;

spray nozzle means disposed adjacent said input side of said filter means for introducing into said exhaust gas flow a dry, finely divided scrubbing agent for removing constituents of said exhaust gas flow, said scrubbing agent being distributed onto said filter surfaces to form a coating thereon; and means defining a second passageway providing gaseous communication between said spray nozzle means and said exhaust gas passageway at a point prior to said input side of said filter, said second passageway defining means branching off a portion of said exhaust gas flow and conducting said portion of said exhaust gas flow to said spray nozzle means to supply a gaseous vehicle for propelling said scrubbing agent through said spray nozzle means and onto said filter surfaces.

2. The incinerator as defined in claim 1 wherein said filter means comprises an electrostatic filter.

3. The incinerator as defined in claim 2 or 1 further comprising:

means defining a chamber containing said filter means; and an exhaust gas register disposed in said exhaust gas passageway at an entrance of said chamber adjacent said input side of said filter means for distributing the flow of exhaust gases over said input side of said filter means;

said spray nozzle means being immediately adjacent a side of said register facing away from said filter means.

4. The incinerator as defined in claim 3 wherein said spray nozzle means comprise individual nozzles evenly distributed within an annular nozzle casing disposed at said side of said register.

* * * * *